(12) United States Patent
Patrick et al.

(10) Patent No.: US 7,331,113 B1
(45) Date of Patent: Feb. 19, 2008

(54) TOOL ALIGNMENT DEVICE

(76) Inventors: Algird Patrick, 34 J Reter Ln, Somerset, NJ (US) 08873; Armen P. Sarvazyan, 1753 Linvale Harbourton Rd., Lambertville, NJ (US) 08530-3302

( * ) Notice: Subject to any disclaimer, the term of this patent is extended or adjusted under 35 U.S.C. 154(b) by 81 days.

(21) Appl. No.: 11/737,318

(22) Filed: Apr. 19, 2007

(51) Int. Cl.
  *B23B 49/00* (2006.01)
  *G01B 11/26* (2006.01)
(52) U.S. Cl. .............. 33/286; 33/334; 33/DIG. 21
(58) Field of Classification Search .......... 33/285–286, 33/333–334, DIG. 21, 281–283
See application file for complete search history.

(56) References Cited

U.S. PATENT DOCUMENTS

| | | | |
|---|---|---|---|
| 5,052,112 | A | 10/1991 | MacDonald |
| 6,301,997 | B1 * | 10/2001 | Welte ........................... 33/286 |
| 6,375,395 | B1 | 4/2002 | Heintzeman |
| 6,565,227 | B1 | 5/2003 | Davis |
| 6,587,184 | B2 | 7/2003 | Wursch |
| 6,681,869 | B2 | 1/2004 | Wursch |
| 6,692,200 | B2 | 2/2004 | Peterson |
| 6,851,487 | B1 * | 2/2005 | Shotey ........................... 173/1 |
| 6,898,860 | B2 | 5/2005 | Wu |
| 7,140,118 | B2 * | 11/2006 | Adrian ........................... 33/286 |
| 7,182,148 | B1 * | 2/2007 | Szieff ........................... 33/333 |
| 2002/0145724 | A1 | 10/2002 | Wursch |
| 2006/0053643 | A1 * | 3/2006 | Adrian ........................... 33/286 |

FOREIGN PATENT DOCUMENTS

| | | |
|---|---|---|
| DE | 10013943 | 3/2001 |
| GB | 2307756 | 6/1997 |
| JP | 5309508 | 11/1993 |
| WO | WO03041916 | 5/2003 |

* cited by examiner

*Primary Examiner*—Yaritza Guadalupe-McCall
(74) *Attorney, Agent, or Firm*—Boris Leschinsky

(57) ABSTRACT

Disclosed is a tool alignment device that aids the operator in positioning a hand tool such as a drill or driver perpendicular, parallel or a specific angle to the target surface. Importantly, the operator can observe the device an omni-directional line-of-sight. The device includes of a light beam emitting/detecting device, which is affixed to the tool, and a flat optical reflector, which is placed on the target surface. The light-emitting device is used to project a beam of light onto the reflector, collinearly with the axis of the tool. The beam is reflected back to the device and lights up a light guide indicating when the tool is perpendicular to or at a specific angle to the target surface.

16 Claims, 9 Drawing Sheets

TOOL ALIGNMENT DEVICE

The present invention relates generally to aligning hand held tools with respect to a target surface. In particular, this invention aims to provide a simple and accurate method based on using a light beam to determine right angle, parallelism or other angles relative to a target surface when using tools, e.g. to drill a hole perpendicular to the target surface.

BACKGROUND OF THE INVENTION

Currently, drilling perpendicular, parallel or at any other specified angle manually is done by "eyeballing" the angle between the tool and the surface. Because visual judgment is imprecise, it is difficult to achieve the desired results with this method. Subsequently developed mechanical means, such as telescoping drill guides or bubble levels, have also proved to be insufficient.

Generally, mechanical means tend to be bulky and implement-specific, and therefore expensive and inconvenient. Specifically, U.S. Pat. No. 4,154,001 by Serafino is tool-specific and requires considerable set-up time. Similarly, telescoping guides interfere with normal functioning of the implement, because the guide rests on the surface to be drilled.

Consequently, the guide must be attached and detached from the tool depending on whether or not the particular use requires perpendicularity.

Bubble levels are impractical as well, because 1) they require the operator to concentrate on the level rather than surface to be drilled and 2) they must be customized to the angle of the drilling surface, especially if the surface is not horizontal (level) or vertical (plumb).

U.S. Pat. No. 4,125,944 by Esposito et al., shows one example of such device using a bubble level for tool alignment. However, if the surface to be drilled is not precisely horizontal or vertical, this tool is no longer usable. A similar device described in the U.S. Pat. No. 4,656,749 by Ashley et al., is also not usable on any fixed surface that is not perfectly horizontal or vertical.

U.S. Pat. No. 5,302,833 by Hamar et al. discloses a laser alignment control system for aligning a rotational portion of a machine tool to a master part. The system includes a laser emitter that is mountable to one of the components being aligned, a photosensitive target mountable to the other components, a data acquisition subsystem for receiving signals from the target and calculating alignment errors and required corrections for the system, and a rotational orientation sensor operatively connected to the data acquisition subsystem. The system is bulky, complex and the alignment procedure requires rotating the target for the laser emitter in the rotating tool holder or the master part. Similar drawbacks are present in an apparatus for obtaining mutual angular alignment of two remotely positioned objects disclosed in the U.S. Pat. No. 4,306,806 by Barron. This apparatus comprises a collimated light source associated with one of the two objects, a prism associated with the other of the two objects, and a viewing screen or device for viewing images created by the light source and the prism.

U.S. Pat. No. 5,596,403 by Schiff et al. discloses a system for measuring relative angular position of two objects, which includes a source assembly and a receiver assembly. A source assembly emits a rotationally polarized carrier wave laser beam. A laser beam from a laser diode is directed through a linear polarizer and then through the center of a rotating half-wave plate. The plate is secured to a hollow shaft of an electric motor. The beam travels through the plate and through the hollow shaft. A reference signal corresponding to the rotational modulation imposed by the rotating plate is obtained using a flag which is secured to the shaft and positioned to actuate an optical encoder. After leaving the source assembly and reaching the receiver assembly, the beam travels through another linear polarizer, a neutral density filter, and an aplanatic achromatic lens to a two-dimensional position sensing detector. The system is complex and unusable for hand held tools.

U.S. Pat. No. 6,692,200 by Peterson incorporated herein by reference discloses a system incorporating a laser beam, which reflects from a housed mirror to a translucent screen affixed to the housing. Alignment can be verified when the reflected laser beam is coincident with the emitted laser beam as seen on the translucent screen, thus indicating perpendicularity. This system is flawed in that the translucent screen is placed close to the mirror. The closer the translucent screen (detector) is to the mirror (reflector) the greater is the inaccuracy of the system. This system is further limited in that the operator of the device must be substantially at a visual vantage point that is perpendicular to the translucent screen in order to make use of this device. Additional relevant prior art is described in the German Patent No. DE10013943, Japanese Patent No. JP5309508, and PCT Application No. WO03041916, all incorporated herein in their entirety by reference. These patents describe various drill alignment devices based on a light beam reflected from the target surface and providing therefore a means for tool alignment.

The need exists, therefore, for an inexpensive, non-implement-specific, simple and easy-to-use device that can aid in visual alignment of handheld tools on any flat surface from an omni directional line-of-sight.

SUMMARY OF THE INVENTION

The object of the present invention is to overcome the drawbacks of the prior art and provide a light beam based alignment device aiding in visual positioning of a tool, such as a hand-held drill, perpendicular, parallel or at a desired angle to a flat target plane or surface.

In it's simplest and most utilitarian form, the device utilizes a light source emitting a narrow light beam, which is mounted coaxially within an alignment indicator comprising a transparent light-transmitting cylindrical light guide, both of which are assembled inside a housing. The light source could be a laser or a focused light emitting diode (LED). The device is incorporated with or mounted onto a tool, such as a hand drill such as the device axis is substantially parallel with the functional axis of the tool. The functional axis of the tool is defined as an axis along which the tool provides its action. In case of a drill or a screw driver, this is an axis of drill rotation. In case of a nail driver, it is the axis along which the nails are dispensed.

The angle of the light beam reflected back from the target surface is used to determine the angle or parallelism of the tool to the target surface. An angularly adjustable flat reflector is placed upon or affixed to a flat target surface. To determine a perpendicular angle, the beam is projected onto the flat reflector placed or mounted parallel to the target surface, and the light beam is positioned such that the beam is reflected coaxially back onto itself. When the tool is properly aligned and the beam is correctly positioned, the light guide will glow with the received light, allowing the operator to ascertain that the tool is perpendicular to the target surface from the omni-directional line-of-sight. To align the tool at a specific preselected angle, this basic method is supplemented by an angularly adjustable flat reflector placed upon said target surface at that desired angle.

BRIEF DESCRIPTIONS OF THE DRAWINGS

Other characteristics and advantages of the invention will become apparent in the course of the following description of several of its embodiments, given by way of non-limiting examples, in conjunction with the appended drawings. In the drawings.

NUMERICAL INDEX

1—Tool Alignment Device
2—Hand Drill
3—Light Source
4—Transparent Plastic Light guide
5—Opaque Housing
6—Emitted Light Beam
7—Target Surface
8—Flat Reflective Strip
9—Reflected Light Beam
10—Glowing End of Light Guide, Viewable Omni-Directionally
11—Optional Lens
12—45° Flat Mirror
13—Reflective Coating on the Reflective Strip
14—Target Drilling Point
15—Crosshair Alignment Indicator
16—Angularly Adjustable Flat Reflector
17—Angle Scale
18—Translucent Reflected Beam Positioning Aid
19—Projection of Reflected Light Beam on Translucent Focusing Aid
20—Multi-Angle Drilling Attachment
21—Reference surface

DETAILED DESCRIPTION OF THE DRAWINGS

A detailed description of the present invention follows with reference to accompanying drawings in which like elements are indicated by like reference letters and numerals.

Figure 1:
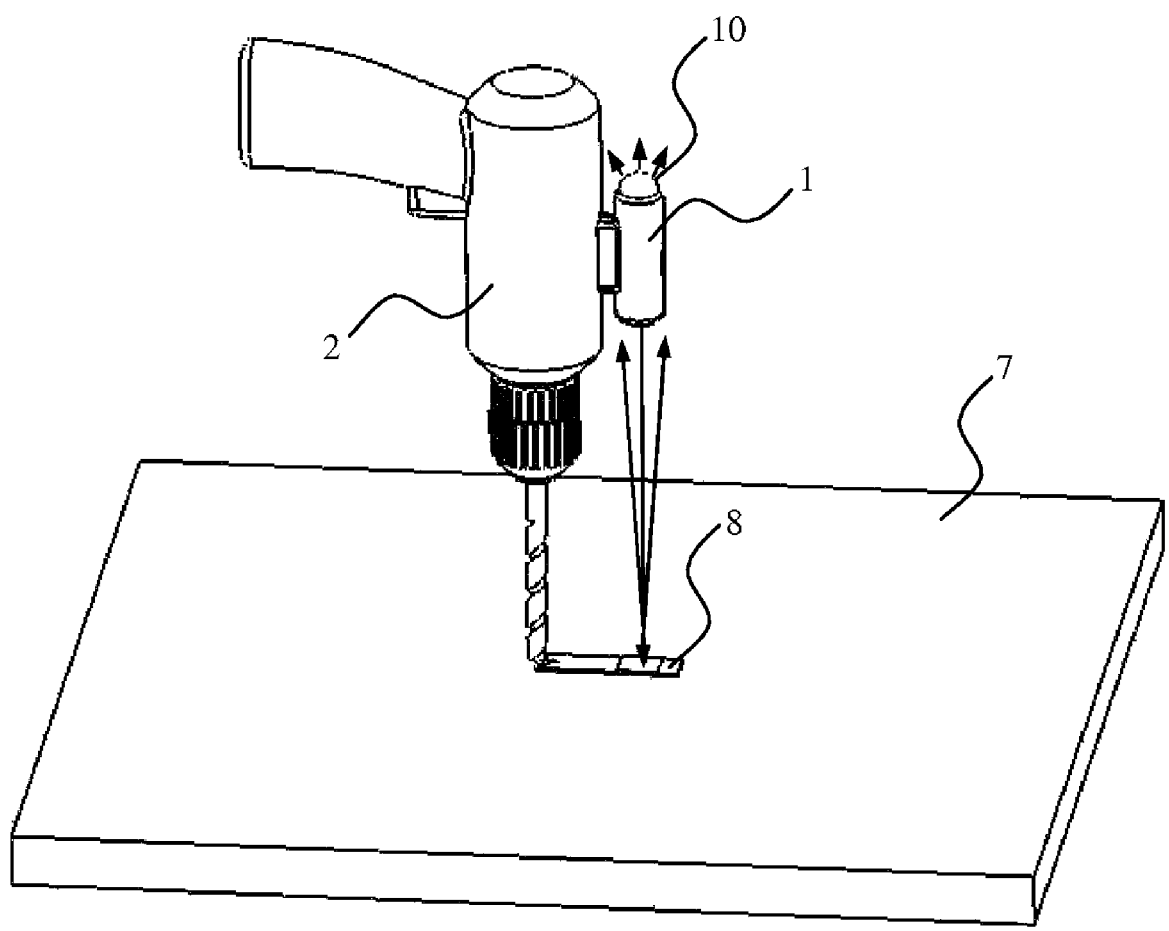
FIG. 1 is a perspective view of the tool alignment device attached to a drill being used to drill a perpendicular hole.
Figure 2A:
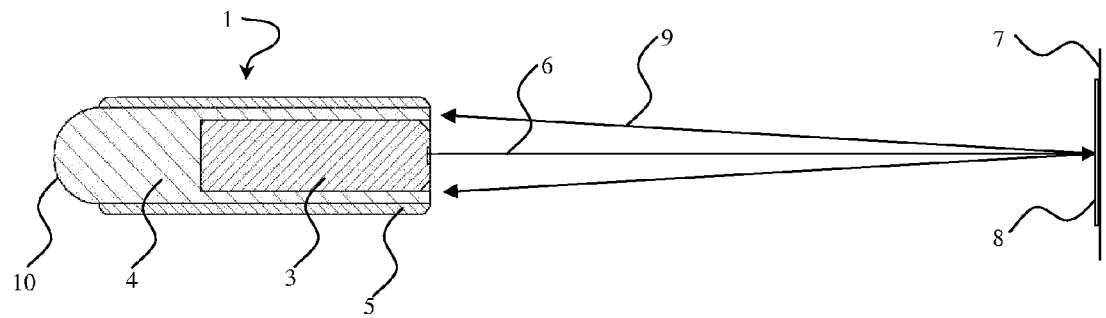
FIGS. 2A, 2B and 2C show cross sectional views of different embodiments of the tool alignment device.
Figure 2B:
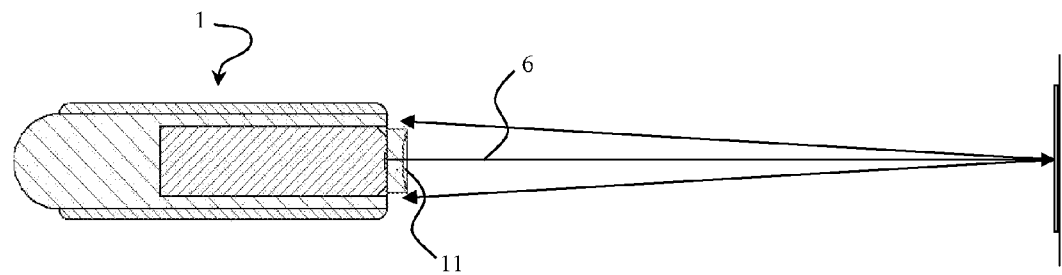
Figure 2C:
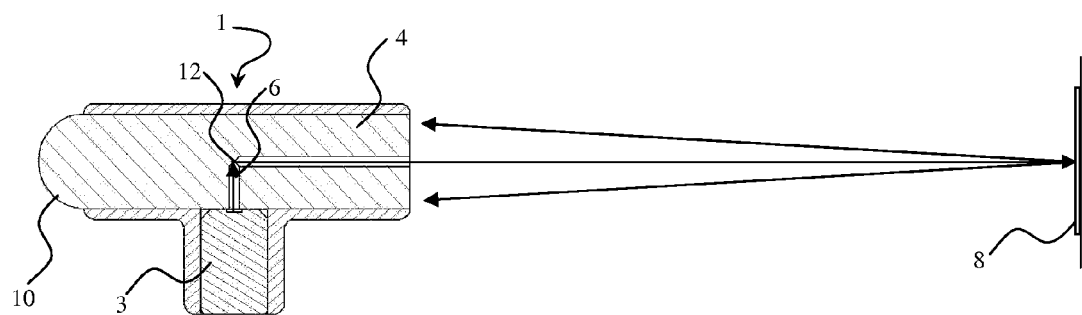

Referring now to the drawings, FIG. 1 shows a perspective view of the first embodiment of the tool alignment device (1) attached to a drill (2) being used to drill a perpendicular hole. Various designs of the tool alignment device (1) are illustrated in more detail in FIGS. 2A, 2B, and 2C. FIG. 2A shows a cross-sectional view of one preferred design of the tool alignment device (1) comprising a light source (3), which could be a laser or a focused light emitting diode (LED), placed in a cylindrical transparent light guide (4) having reflective side walls, which in turn is mounted within a preferably opaque housing (5). A beam of light (6) emitted by the light source is directed on a path parallel with the functional axis of the tool and towards the target surface to be drilled (7) where it is reflected back by a reflector (8) such as a reflective strip placed on the target surface for this purpose. When the emitted light beam is perpendicular to the surface, the reflected light beam (9) causes the preferably convex-shaped back end (10) of the light guide cylinder (4) to glow. That back end faces the operator and when lit, it indicates perpendicularity to the operator from an omni-directional line of sight. FIG. 2B shows a cross-sectional view of the tool alignment device which is identical to that shown in FIG. 2A except that an optional lens (11) is added to achieve an optimal angle of divergence of the emitted light beam (6). FIG. 2C shows a cross-sectional view of the tool alignment device which functions similarly to the device shown in FIG. 2A except that the light source (3) is positioned at right angle (90°) to the axis of the device. The light source (3) emits a light beam (6) reflected 90° from a 45° flat mirror (12) toward the flat reflective strip (8). Placing the light source on the side of the device allows increasing the amount of light received by the light guide (4) and therefore makes the glow of the convex surface (10) brighter.

Figure 3:
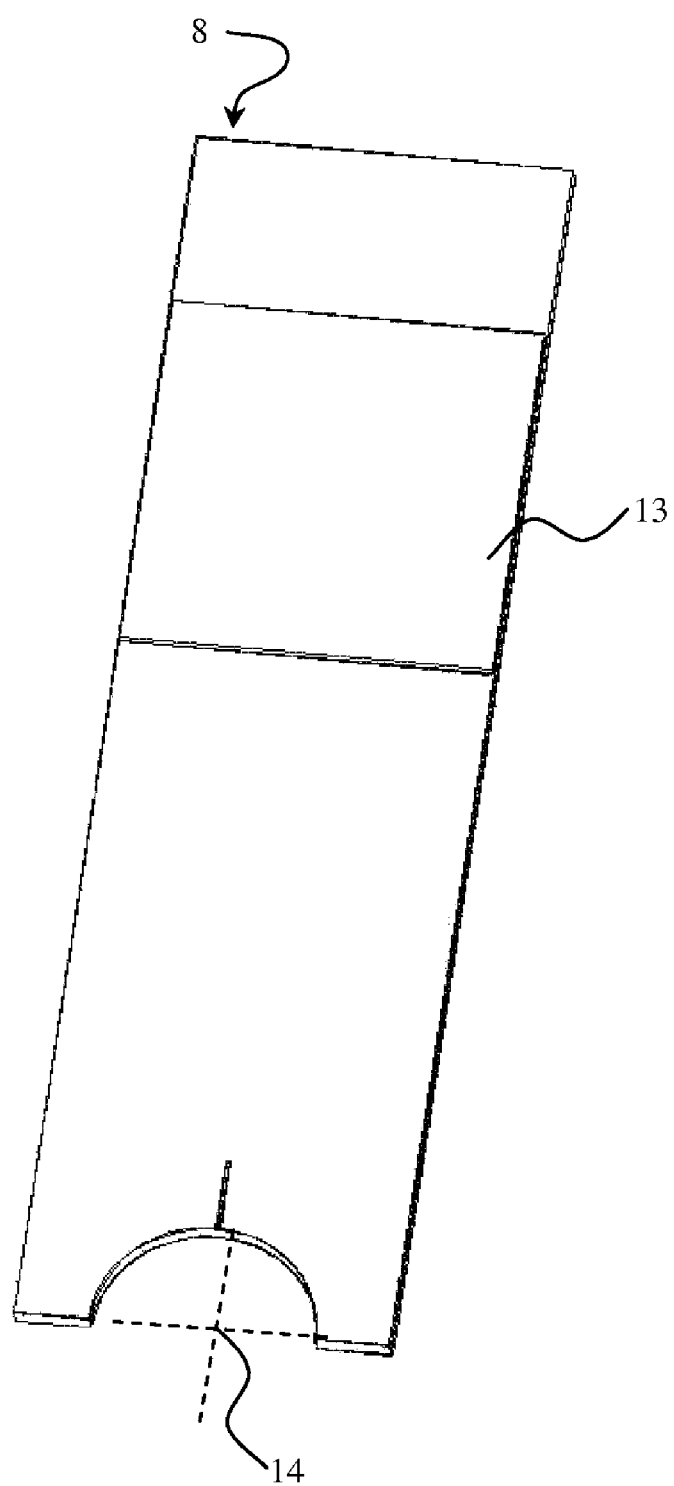
FIG. 3 shows a disposable reflective strip.

FIG. 3 shows a preferred design of the reflector (8) to be affixed to the target surface for drilling. In its preferred configuration, the reflector is made as a reflective strip. A part of one side of the strip (or the entire strip) has a reflective coating (13) so that the light beam from the device is reflected. The drill bit should be placed at the target point (14) indicated by a corresponding indicia. The strip can be made as a disposable adhesive tape contained in a roll and dispensed therefrom using traditional tape dispensers. For the case when the surface to be drilled is small or not quite flat, the strip can be made in the form of a rigid plate made for example from plastic.

For the purposes of this entire description pertaining to all embodiments of the invention, the light guide is generally made from a transparent material such as glass and includes side walls made to be reflective such as for example by coating it with a reflective material. The purpose of the light guide as generally known in the prior art is to transmit the light beam along its length with minimal losses. Reflective walls of the light guide direct the light back into the guide and along its length. Importantly for this particular invention, the back end of the light guide is equipped with a light diffuser such as for example made at least partially with a matte finish. In that case, the light traveling through the light guide causes that back end to glow when illuminated. Matte circles, stripes, dots, or the entire surface of the back end made matte are all contemplated within the scope of the invention. Other methods to diffuse light off the back end of the light guide can also be employed, such as using various reflective surfaces, etc.

Figure 4:
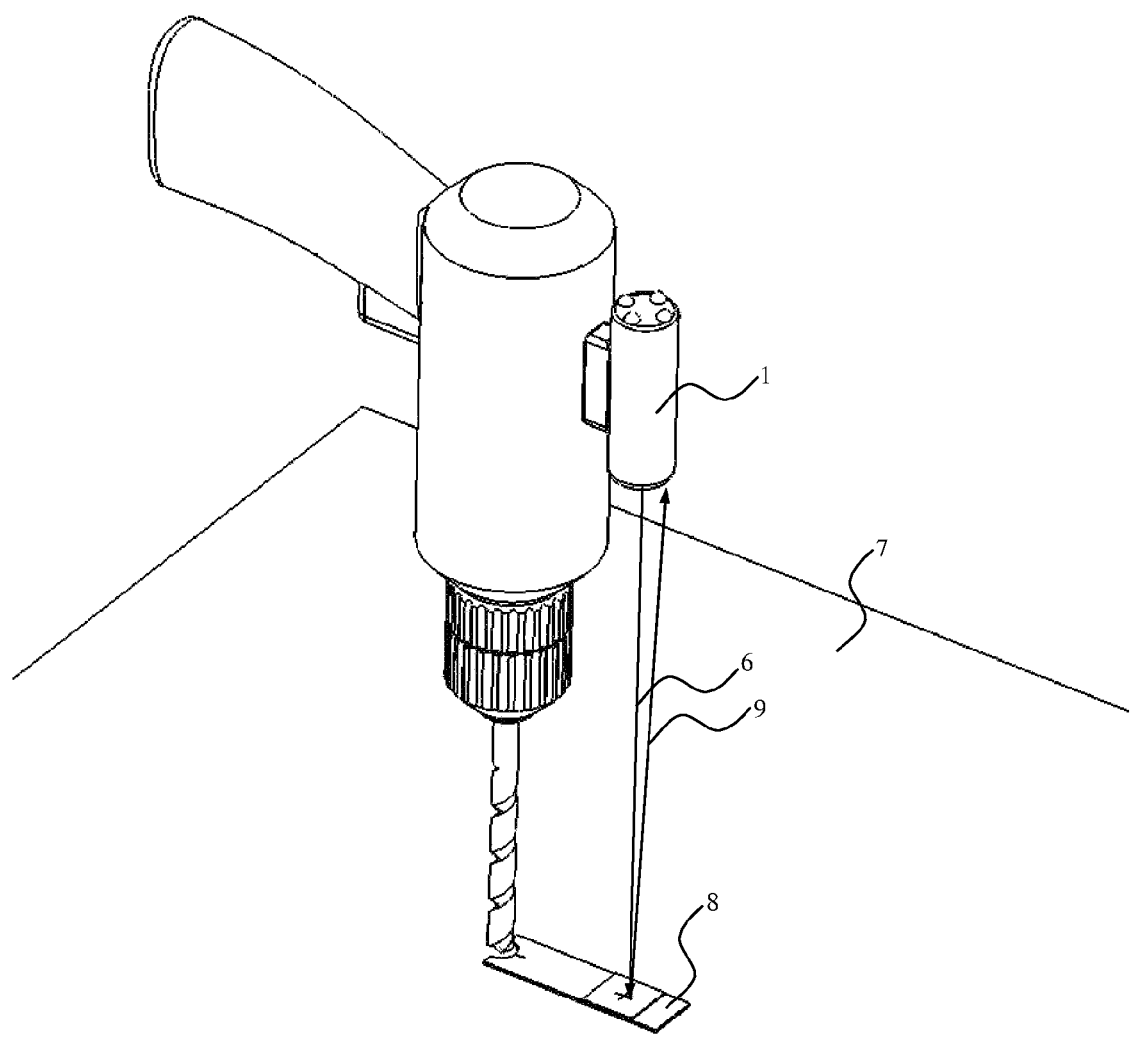
FIG. 4 is a perspective view of a second embodiment of tool alignment device attached to a drill being used to drill a perpendicular hole.
Figure 5A:
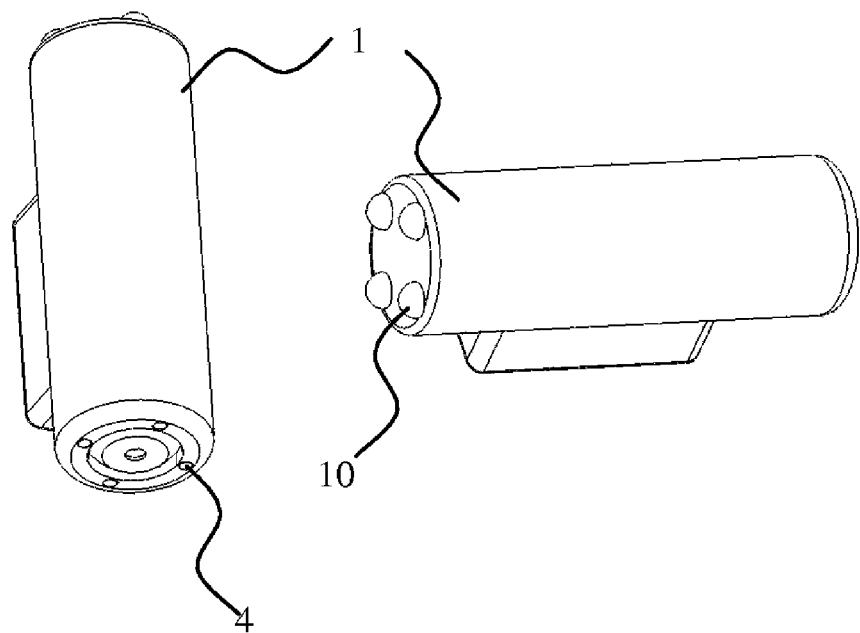
FIG. 5A shows 2 isometric views of the second embodiment of the tool alignment device of the invention illustrated in FIG. 4.
Figure 5B:
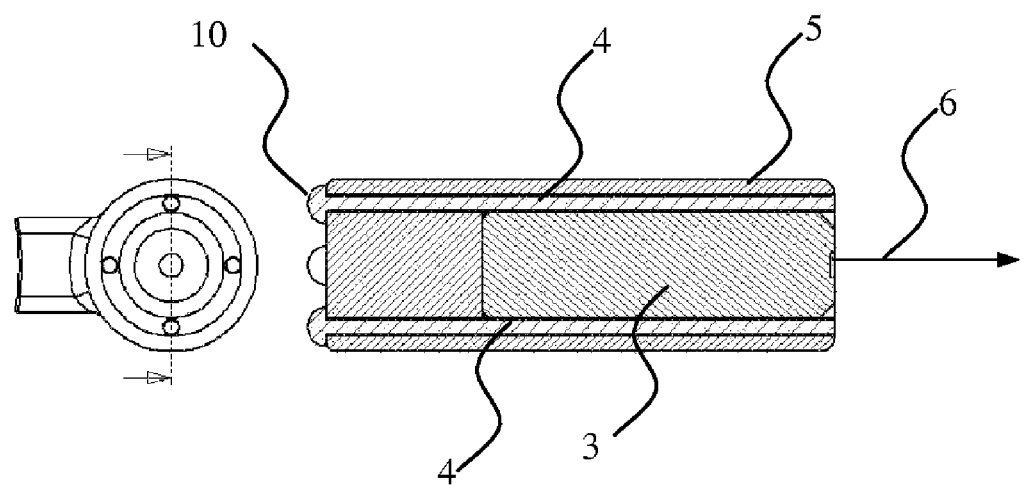
FIG. 5B shows an end and cross sectional views of the second embodiment of the tool alignment device illustrated in FIG. 4.

FIG. 4 shows a general view of the second embodiment of the tool alignment device (1) illustrated in more detail in FIGS. 5A and 5B. The characteristic feature of this embodiment is that the light beam (6) emitted by the light source has a crosshair cross-section shape. FIG. 5A—depicts two isometric views of the device illustrated in FIG. 4. The device contains a light source (3) within an opaque housing (5) also containing a plurality (preferably four) of collinear cylindrical transparent light guides (4) spaced equally (preferably at 90°) apart around a common circle. FIG. 5B depicts an end view and cross section of device shown in FIG. 5A. The light source (3) emits a crosshair light beam (6) which is directed collinearly with the tool towards the target surface to be drilled (7). Once the emitted light beam (6) is perpendicular to the reflective strip as illustrated in FIG. 4, the X-Y axes of the crosshair of the reflected light beam (9) will illuminate the four 90° spaced apart light guides (4), causing their preferably convex ends to glow evenly, and indicating perpendicularity to the operator from an omni-directional line of sight. A misalignment is visible by not having all light guides glow equally bright. The least bright light guide indicated the direction of tool movement to achieve the accurate alignment with the target surface.

Figure 6:
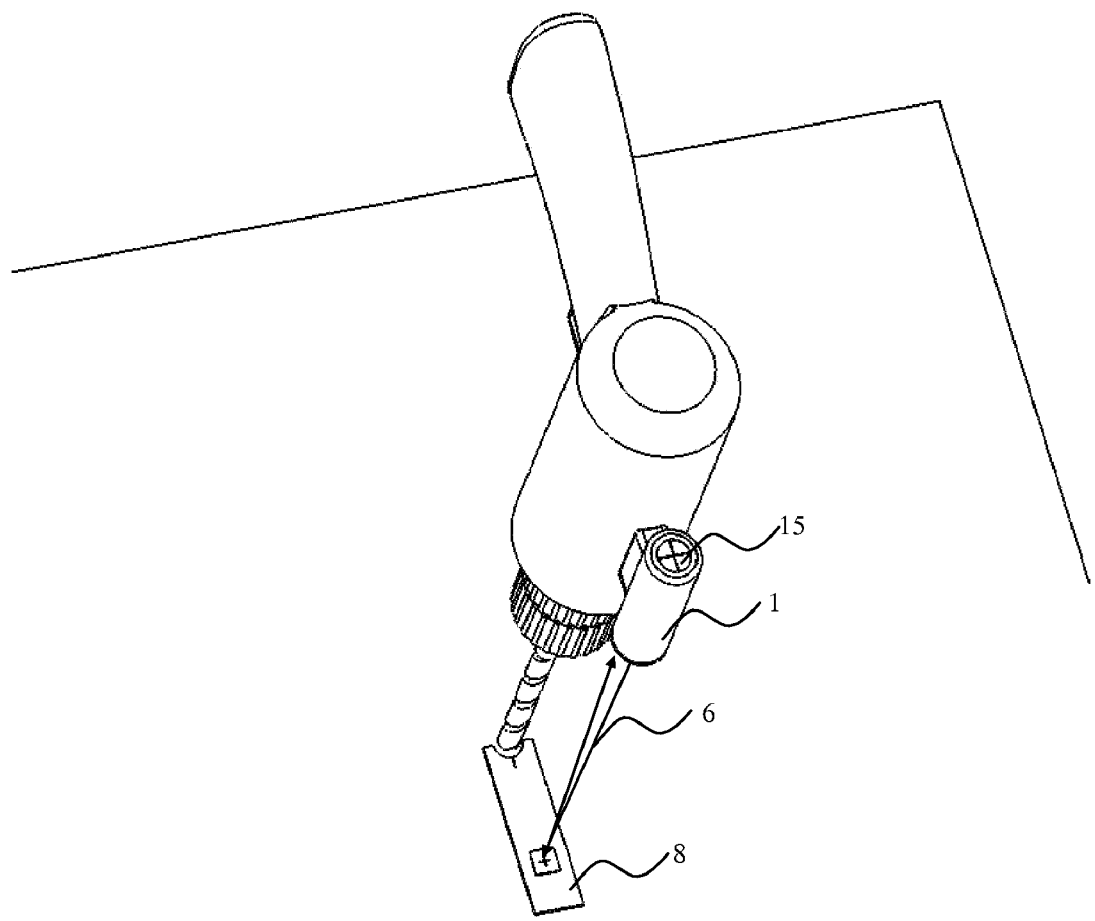
FIG. 6 is a perspective view of a third embodiment of tool alignment device attached to a drill being used to drill a perpendicular hole.
Figure 6A:
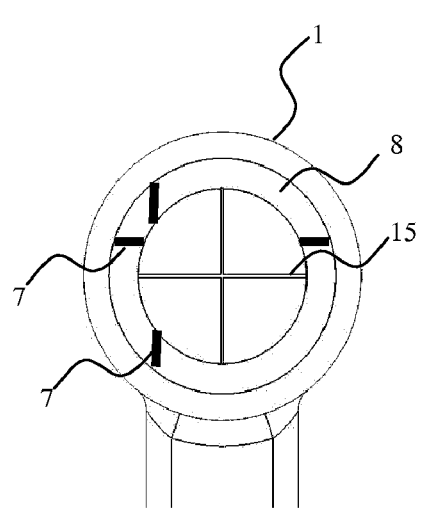
FIG. 6A shows the operator end view of the device shown in FIG. 6 in the positions of the tool slightly off from being perpendicular to the target surface.
Figure 6B:
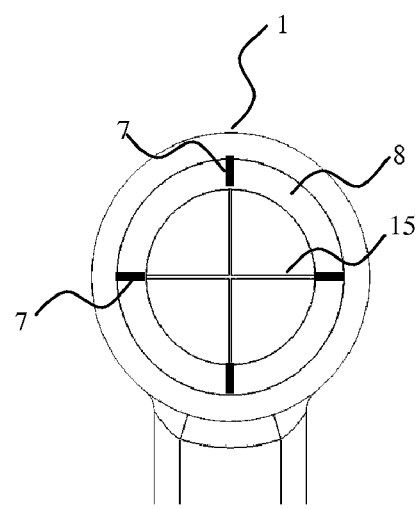
FIG. 6B shows the operator end view of the device of FIG. 6 in the position of the tool exactly perpendicular to the drilling target surface.

FIG. 6 shows a third embodiment of the tool alignment device (1) illustrated in greater detail in FIGS. 6A and 6B. Similar to the embodiment shown in FIG. 4, the light source of the device is emitting a beam (6) in the shape of a crosshair toward the flat reflective strip (8). FIG. 6A shows the operator end view of the device of FIG. 6 in the position of the tool slightly different from the perpendicularity. The part of the device viewed by the operator is comprised of a ring-shaped end of the light guide (4) showing the reflected crosshair light beam (9). The central circular part of the end part of the device is made of nontransparent material which has a cross hair alignment indicator indicia (15) drawn or engraved on this central circle. The operator end view of the device shown in FIG. 6A corresponds to the position of the instrument different form the perpendicularity, therefore the X-Y axes of reflected light beam (9) do not align with the crosshair alignment indicator (15) of device. FIG. 6B shows the operator end view of the device of FIG. 6 in the position of the tool perpendicular to the drilling surface. In this case, the X-Y axes of reflected light beam (9) do align with the crosshair alignment indicator (15) of device.

Figure 7:
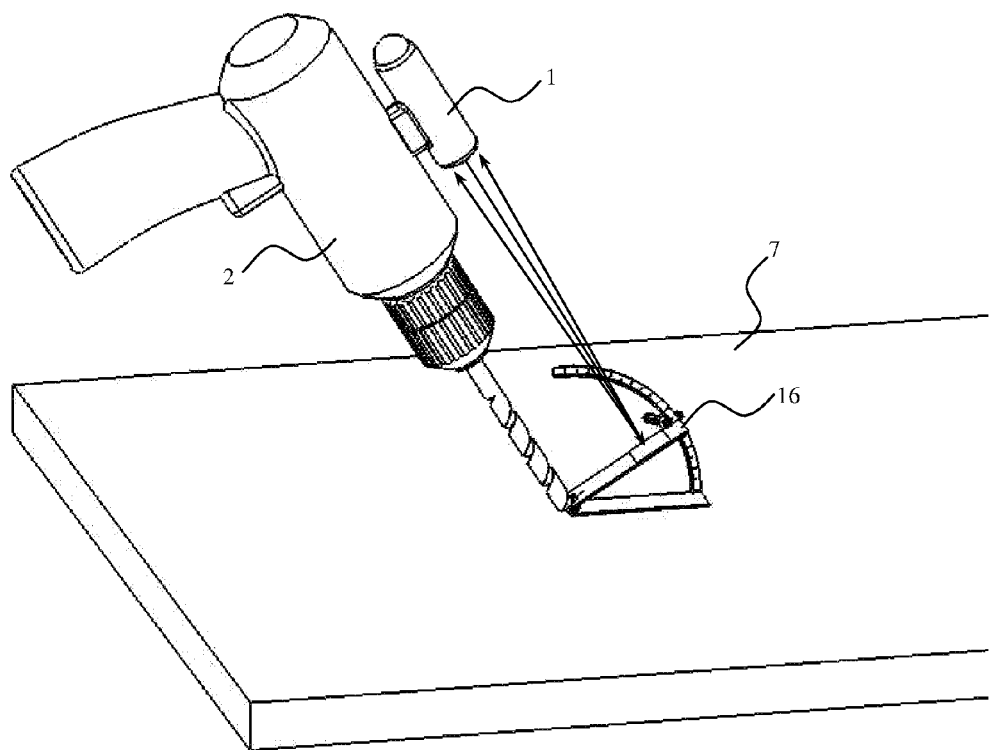
FIG. 7 is a side elevated view of the system for drilling at a specific angle to the target surface.
Figure 7A:
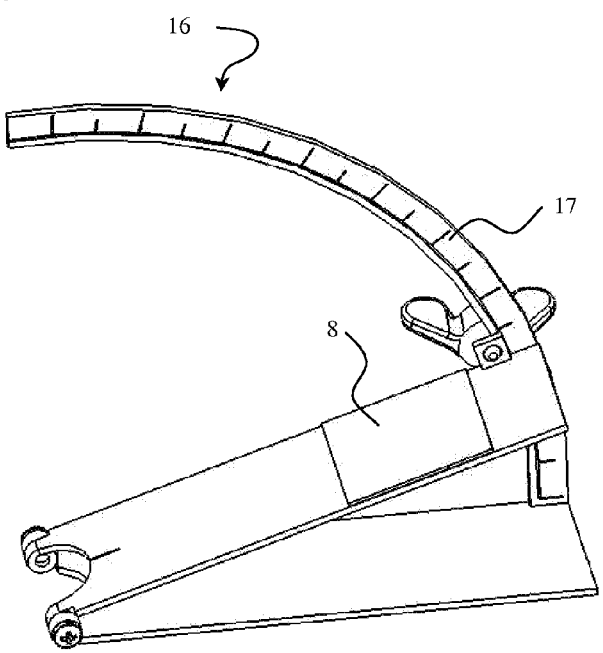
FIG. 7A illustrates an enlarged view of the angularly adjustable (0°-90°) supplementary attachment to the tool alignment device of the present invention.

FIG. 7 shows how drilling at a specific preselected angle may be achieved. The device (1) of any of the previously described designs is mounted on a tool such as a hand drill (2) and includes an angularly adjustable (preferably 0°-90°) supplementary attachment (16) which is placed on or affixed to the target surface (7). This attachment (16) is shown in more detail in FIG. 7A and consists of a protractor and a reflective strip, which reflects the beam of light back onto the device (1) mounted on the drill. The light is reflected at a specific angle to the target surface at which the hole needs to be drilled. To use this device at a specific angle, the operator must set the desired angle on the scale (17) of supplementary attachment (16), and then operate the device in the same way as when drilling a perpendicular hole. Provisions are made to allow the drill to come in contact with the target surface at the center of the attachment (16).

Figure 8:
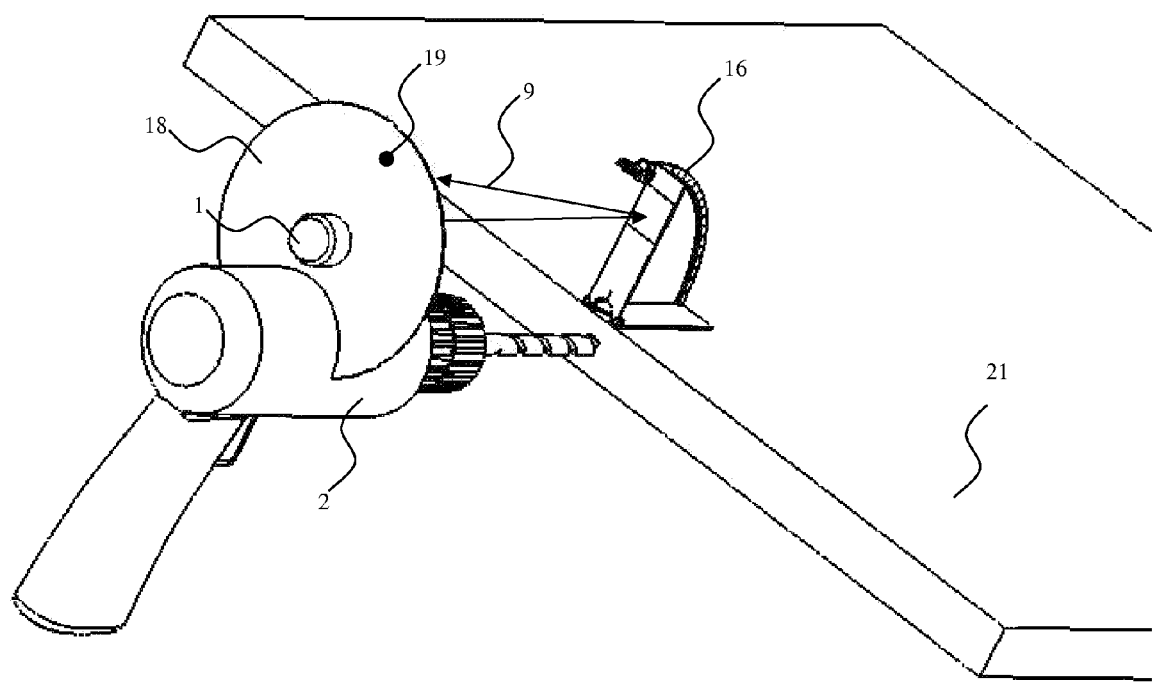
FIG. 8 is a perspective view of tool alignment device attached to a drill being used to drill a hole parallel to the target surface.

FIG. 8 depicts how the device as shown in FIG. 1 can be used to drill holes parallel to a reference surface (21). The angularly adjustable flat reflector of the attachment (17) is set to 90°, and drilling is performed as earlier described. Also shown is an translucent reflected beam positioning aid (18). This detection shield helps to quickly bring the tool to the perpendicular position with regard to the reflector by capturing the reflected light beam (9). At the initial position when the perpendicularity is not yet achieved, the reflected light produces a bright spot (19) on the beam positioning aid (18), which clearly indicates the direction to move the tool to achieve the perpendicularity. Such reflected beam positioning aid (18) can be used with any of the embodiments of the tool aligning device to aid in guiding the reflected beam into the device.

Figure 9:
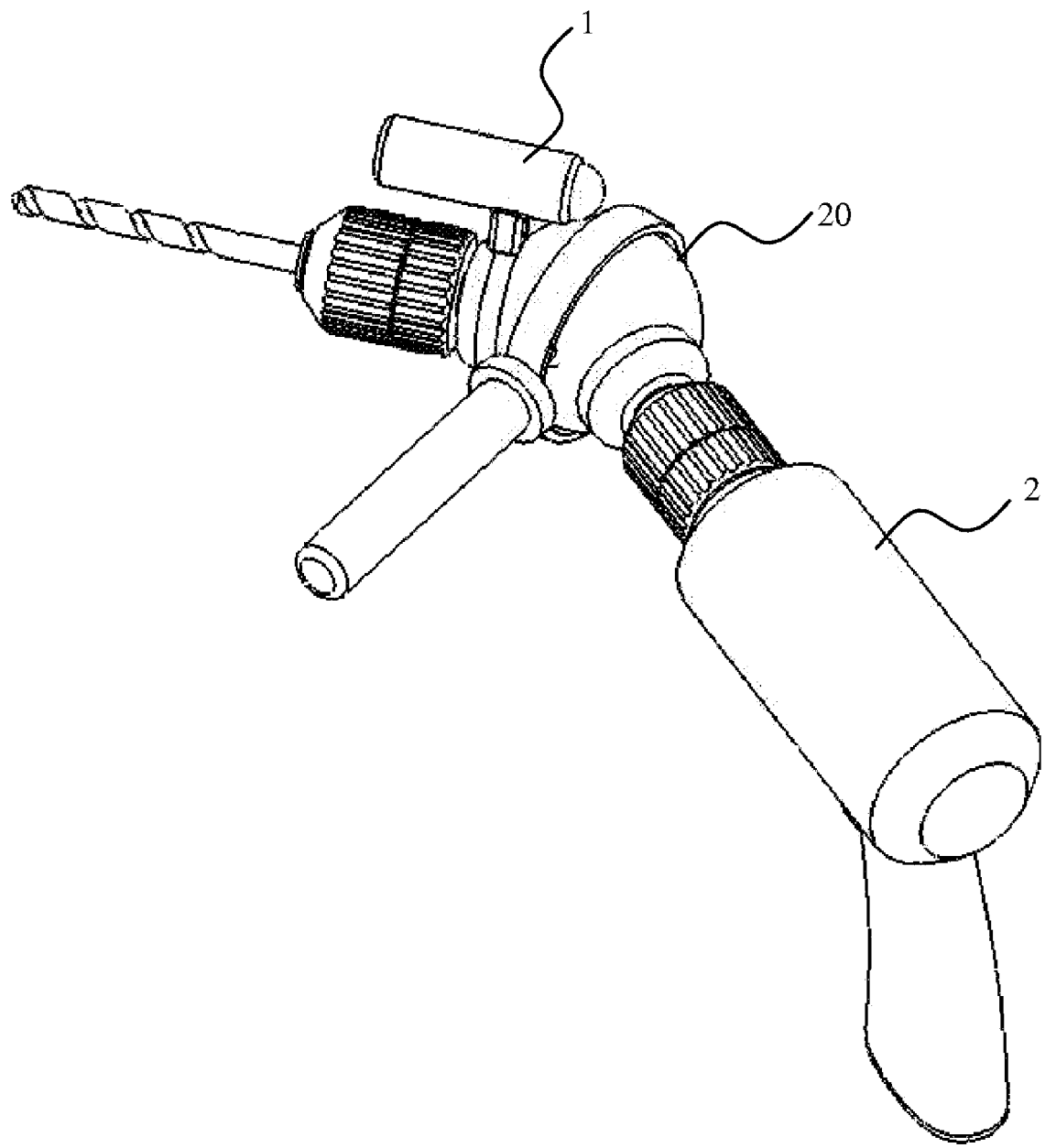
FIG. 9 illustrates the tool alignment device attached to a multi-angle drilling attachment for drilling in confined spaces.

FIG. 9 illustrates how the device (1) may be attached to a multi-angle drilling attachment (20) for use in tight spaces as earlier described with a hand drill (2).

Although the invention herein has been described with respect to particular embodiments, it is understood that these embodiments are merely illustrative of the principles and applications of the present invention. For example, such hand and power tools as a screw driver, a stapler, a nail driver, etc. can also all benefit from the device of the invention. It is therefore to be understood that numerous modifications may be made to the illustrative embodiments and that other arrangements may be devised without departing from the spirit and scope of the present invention as defined by the appended claims.

What is claimed is:

1. A tool alignment device for aligning the tool at a preselected angle to a target surface, said tool having
 a functional axis, said device comprising:
  a light source emitting a narrow light beam on a path toward said target surface and substantially parallel to said functional axis of the tool,
  an alignment indicator including a light guide mounted coaxially with said light beam path, said light guide made from a transparent material surrounded by reflective side walls, said light guide terminating with a back end equipped with a light diffuser, and
  a reflector positioned on said target surface at said preselected angle thereto and in the path of the beam so as to intercept said beam and reflect it therefrom and toward said alignment indicator,
 whereby when said tool is aligned with said target surface at said preselected angle, said reflected light beam travels through said light guide causing said back end thereof to glow, indicating the proper alignment of said tool.

2. The device as in claim 1, wherein said light guide further equipped with an optical lens mounted in front thereof and adapted to achieve a proper divergence angle for said reflecting light beam.

3. The device as in claim 1, wherein said light source is aimed at said alignment indicator at 90 degree angle, said alignment indicator containing a 45 degree flat mirror, directing a light beam from said light source towards said target surface.

4. The device as in claim 1, wherein said light source is a laser.

5. The device as in claim 1, wherein said light source is a focused light emitting diode.

6. The device as in claim 1, wherein said back end of said light guide is convex-shaped such that when illuminated by said reflecting light beam, its glowing is visible from an omni-directional line of sight.

7. The device as in claim 1, wherein said reflector is an adhesive reflective strip having a reflective coating at least on one side thereof and an indicia to indicate the target point for proper placement of said tool onto said target surface.

8. The device as in claim 1, wherein said beam emanating from said light source has crosshair cross-section shape.

9. The device as in claim 1, wherein said alignment indicator includes a plurality of light guide cylinders equally and coaxially spaced about the path of said light beam.

10. The device as in claim 9, wherein said alignment indicator including four of said light guide cylinders spaced apart at 90 degrees about said path, whereby said alignment is proper only when all four of said light guides are illuminated evenly as indicated by their glowing back ends.

11. The device as in claim 1, wherein said alignment indicator includes a central non-transparent cylinder part surrounded by a ring-shaped light guide.

12. The device as in claim 11, wherein said light source is adapted to emit a light beam with crosshair shape and said non-transparent cylinder part has a crosshair alignment indicator indicia, whereby proper tool alignment is confirmed by coinciding the crosshair light beam reflected from said target surface with said crosshair alignment indicator indicia.

13. The device as in claim 1, wherein said reflector further includes an angularly adjustable attachment adapted to be placed on said target surface and position a reflective strip at said preselected angle thereto.

14. The device as in claim 13, wherein said attachment includes an adjustable protractor indicating the angle between said target surface and said functional axis of said tool.

15. The device as in claim 1, wherein said device further including a translucent reflected beam positioning aid surrounding said alignment indicator and adapted to show the position of the reflected beam when outside said alignment indicator during initial positioning of said tool.

16. The device as in claim 1, wherein said light diffuser is a matte finish over at least a portion of said back end of the light guide.

\* \* \* \* \*